(12) United States Patent  
Ng

(10) Patent No.: US 9,128,539 B2
(45) Date of Patent: Sep. 8, 2015

(54) ERGONOMIC MOUSE DEVICE WITH MULTI-PROGRAMMABLE BUTTONS

(75) Inventor: Chern Ann Ng, Singapore (SG)

(73) Assignee: RAZER (ASIA-PACIFIC) PTE LTD, Singapore (SG)

( * ) Notice: Subject to any disclaimer, the term of this patent is extended or adjusted under 35 U.S.C. 154(b) by 435 days.

(21) Appl. No.: 12/302,991

(22) PCT Filed: Nov. 30, 2007

(86) PCT No.: PCT/SG2007/000411
§ 371 (c)(1),
(2), (4) Date: Jun. 18, 2010

(87) PCT Pub. No.: WO2009/070125
PCT Pub. Date: Jun. 4, 2009

(65) Prior Publication Data
US 2010/0245249 A1   Sep. 30, 2010

(51) Int. Cl.
*G06F 3/033*  (2013.01)
*G09G 5/08*   (2006.01)
*G09G 5/00*   (2006.01)
*G06F 3/0354* (2013.01)

(52) U.S. Cl.
CPC .... *G06F 3/03543* (2013.01); *G06F 2203/0333* (2013.01)

(58) Field of Classification Search
CPC ....................... G06F 2203/033; G06F 3/03543
USPC ......................................................... 345/163
See application file for complete search history.

(56) References Cited

U.S. PATENT DOCUMENTS

| | | | |
|---|---|---|---|
| 7,023,536 B2 | 4/2006 | Zhang et al. |
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |

(Continued)

FOREIGN PATENT DOCUMENTS

| | | | |
|---|---|---|---|
| CN | 1667557 | 9/2005 | |
| EP | 757327 A2 * | 7/1996 | ............. G06K 11/18 |

(Continued)

OTHER PUBLICATIONS

"Chinese Office Action dated Feb. 13, 2012," Chinese Application No. 200780101940.8, 4 pages.

(Continued)

*Primary Examiner* — Mark Regn
(74) *Attorney, Agent, or Firm* — Novak Druce Connolly Bove + Quigg LLP

(57) ABSTRACT

Pointing devices such as computer mouse are commonly used for making selections on computer screens. However, prolong or frequent use of such pointing devices might result in users suffering from repetitive stress disorder. Further, due to the widespread use of personal computers (PC), this problem is made more even pronounced. In addition, users increasingly require additional buttons to be provided on the computer mouse for purposes such as PC gaming. Although device manufacturers have started building more buttons on existing computer mice, the buttons are typically not ergonomically positioned. An embodiment of the invention describes an ergonomic input device with multi-programmable buttons.

13 Claims, 12 Drawing Sheets

(56) References Cited

U.S. PATENT DOCUMENTS

| | | |
|---|---|---|
| 7,203,384 B2 | 4/2007 | Carl |
| 7,268,956 B2 | 9/2007 | Mandella |
| 7,474,809 B2 | 1/2009 | Carl et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 8,542,219 B2 | 9/2013 | Carl et al. |
| 8,553,935 B2 | 10/2013 | Mandella et al. |
| 2002/0063688 A1* | 5/2002 | Shaw et al. ............ 345/163 |
| 2005/0052416 A1* | 3/2005 | Backman et al. ........ 345/163 |
| 2005/0168437 A1 | 8/2005 | Carl et al. |
| 2006/0209014 A1 | 9/2006 | Duncan et al. |
| 2006/0274044 A1* | 12/2006 | Gikandi ............... 345/163 |
| 2007/0038872 A1* | 2/2007 | Bridges et al. .......... 713/193 |
| 2008/0143677 A1* | 6/2008 | O'Keeffe et al. ........ 345/163 |
| 2008/0259032 A1* | 10/2008 | Chen et al. ............ 345/163 |
| 2009/0046064 A1* | 2/2009 | Manalo et al. .......... 345/164 |
| 2011/0227915 A1 | 9/2011 | Mandella et al. |
| 2012/0038549 A1 | 2/2012 | Mandella et al. |
| 2013/0194418 A1 | 8/2013 | Gonzalez-Banos et al. |

FOREIGN PATENT DOCUMENTS

| | | |
|---|---|---|
| KR | 10-2000-0036928 | 7/2000 |
| KR | 10-2002-0001212 | 1/2002 |
| KR | 20-0277580 | 6/2002 |
| TW | 579017 | 3/2003 |
| TW | 200741515 | 11/2007 |
| WO | 91-04526 A1 | 4/1991 |
| WO | 02-099616 A2 | 12/2002 |
| WO | 03-021419 A1 | 3/2003 |
| WO | 2004-025447 A2 | 3/2004 |

OTHER PUBLICATIONS

"Korean Office Action dated Nov. 29, 2013," Korean Application No. 10-2010-7014271, 11 pages.

"Korean Office Action dated Jun. 12, 2014," Korean Application No. 10-2010-7014271, 6 pages.

"Taiwan Office Action, date unknown," Taiwan Application No. 094146105, 12 pages.

\* cited by examiner

| Software Application | |
|---|---|
| Key: | |
| Launch application: | |
| Load "shortcut-key" profile: | | ically pre-built with one or two buttons. However, to
ERGONOMIC MOUSE DEVICE WITH MULTI-PROGRAMMABLE BUTTONS This application is a U.S. Phase Application under 35 USC §371of International Application No. PCT/SG2007/000411, filed Nov. 30, 2007. The foregoing application is hereby incorporated by reference in its entirety.

FIELD OF INVENTION

The invention relates generally to human interface devices for computers. In particular, the invention relates to an ergonomic mouse device with multi-programmable buttons.

BACKGROUND

Pointing devices such as computer mouse are commonly used, for example, to control cursor movement displayed on a computer screen for making selections on a graphical user interface (GUI). The use of pointing devices often involves highly repetitive hand and finger movements and positions. Some forms of repetitive stress disorder such as the carpal tunnel syndrome (CTS) may be attributed to frequent use of pointing devices, particularly where awkward and stressful movements and/or positions are involved. Hence, pointing devices having configurations that force the wrist, hand and fingers of a user to assume awkward and stressful positions and/or movements are undesirable.

Additionally, the problem of users suffering from repetitive stress disorder due to use of pointing devices is even more pronounced in today's environment, where the deployment of personal computers (PCs) for different purposes ranging from productivity work to gaming is highly ubiquitous, as compared to the past. Notably, PC gaming is gaining enormous popularity worldwide due to the emergence of the Internet as a platform for allowing gamers to easily interact with one another through online gaming. PC games being played online normally belong to genres ranging from first person shooter (FPS) games to massive multiplayer online role player games (MMORPGs). Typically, pointing devices, such as the computer mouse, are used together with keyboards as means for enabling users to interact with the PC games.

Due to rise in popularity of PC gaming, users require more buttons than ever before to be provided on the computer mouse for activating additional functionalities and features of the PC games "on-the-fly". Conventionally, computer mouse are typically pre-built with one or two buttons. However, to take advantage of macro "shortcut" functions provided by software and PC games, device manufacturers have been building additional buttons onto the computer mouse such as locating the additional buttons on the lateral sides of the left and right mouse buttons of the computer mouse. Due to the awkward positioning of the additional buttons fitted to conform to the shape of the computer mouse, the additional buttons are thus not easily accessible by the users.

Hence, in view of the foregoing problems, there affirms a need for a device with buttons that are ergonomically positioned thereon.

SUMMARY

Embodiments of the invention disclosed herein provide an ergonomic input device with multi-programmable buttons.

In accordance with a first aspect of the invention, there is disclosed an input device for communicating with a processor-based device. The input device comprises a circuitry, a first displacement transducer, a body and a plurality of actuators. The first displacement transducer is coupled to the circuitry for transducing detected displacement into displacement signals, the circuitry for communicating the displacement signals to the processor-based device for manipulating an object on the processor-based device. The body houses the circuitry and the first displacement transducer, the body having a base for being supported on a surface when in use and a support surface outwardly opposing the base, at least a portion of the support surface for supporting the mid-palm of the user when in use, the body having a depressible key formed on the support surface. The plurality of actuators formed on the support surface of the body and positioned along the periphery of the depressible key, the plurality of actuators being coupled to the circuitry. Further, the plurality of actuators is operable for generating actuating signals detectable by the circuitry, the actuating signals being communicable to the processor-based device by the circuitry for operating a function on the processor-based device.

In accordance with a second aspect of the invention, there is disclosed an input device for communicating with a processor-based device. The input device comprises a circuitry, a first displacement transducer, a body, a receptacle and an actuator module. The first displacement transducer is coupled to the circuitry for transducing detected displacement into displacement signals, the circuitry for communicating the displacement signals to the processor-based device for manipulating an object on the processor-based device. The body houses the circuitry and the first displacement transducer, the body having a base for being supported on a surface when in use and a support surface outwardly opposing the base, at least a portion of the support surface for supporting the mid-palm of the user when in use, the body having a depressible key formed on the support surface. The receptacle is formed in the support surface of the body and positioned along the periphery of the depressible key, the receptacle having electrical contacts formed therein and coupled to the circuitry. The actuator module comprises a plurality of actuators, the actuator module being receivable into the receptacle. Further, the plurality of actuators of the actuator module is operable for generating actuating signals detectable by the circuitry via the electrical contacts, the actuating signals being communicable to the processor-based device by the circuitry for operating a function on the processor-based device.

In accordance with a third aspect of the invention, there is disclosed an input device for communicating with a processor-based device. The input device comprises a circuitry, a first displacement transducer, a body and a receptacle. The first displacement transducer is coupled to the circuitry for transducing detected displacement into displacement signals, the circuitry for communicating the displacement signals to the processor-based device. The body houses the circuitry and the first displacement transducer, the body having a base for being supported on a surface when in use and a support surface outwardly opposing the base, at least a portion of the support surface for supporting the mid-palm of the user when in use. The receptacle is formed in the support surface of the body, the receptacle having electrical contacts formed therein and coupled to the circuitry, the receptacle for receiving an actuator module thereinto, the actuator module comprising at least one actuator. When the actuator module is received in the receptacle, the at least one actuator of the actuator module is operable for generating actuating signals detectable by the circuitry via the electrical contacts, the actuating signals being communicable to the processor-based device by the circuitry for operating a function on the processor-based device.

In accordance with a fourth aspect of the invention, there is disclosed an input device for communicating with a processor-based device. The input device comprises a circuitry, a body and a receptacle. The body houses the circuitry, the body having a base for being supported on a surface when in use and a support surface outwardly opposing the base, at least a portion of the support surface for supporting the mid-palm of the user when in use. The receptacle is formed in the support surface of the body, the receptacle having electrical contacts formed therein and coupled to the circuitry, the receptacle for receiving an actuator module thereinto, the actuator module comprising at least one actuator. When the actuator module is received in the receptacle, the at least one actuator of the actuator module is operable for generating actuating signals detectable by the circuitry via the electrical contacts, the actuating signals being communicable to the processor-based device by the circuitry for operating a function on the processor-based device.

BRIEF DESCRIPTION OF THE DRAWINGS

Embodiments of the invention are disclosed hereinafter with reference to the drawings, in which.

DETAILED DESCRIPTION

Figure 1:
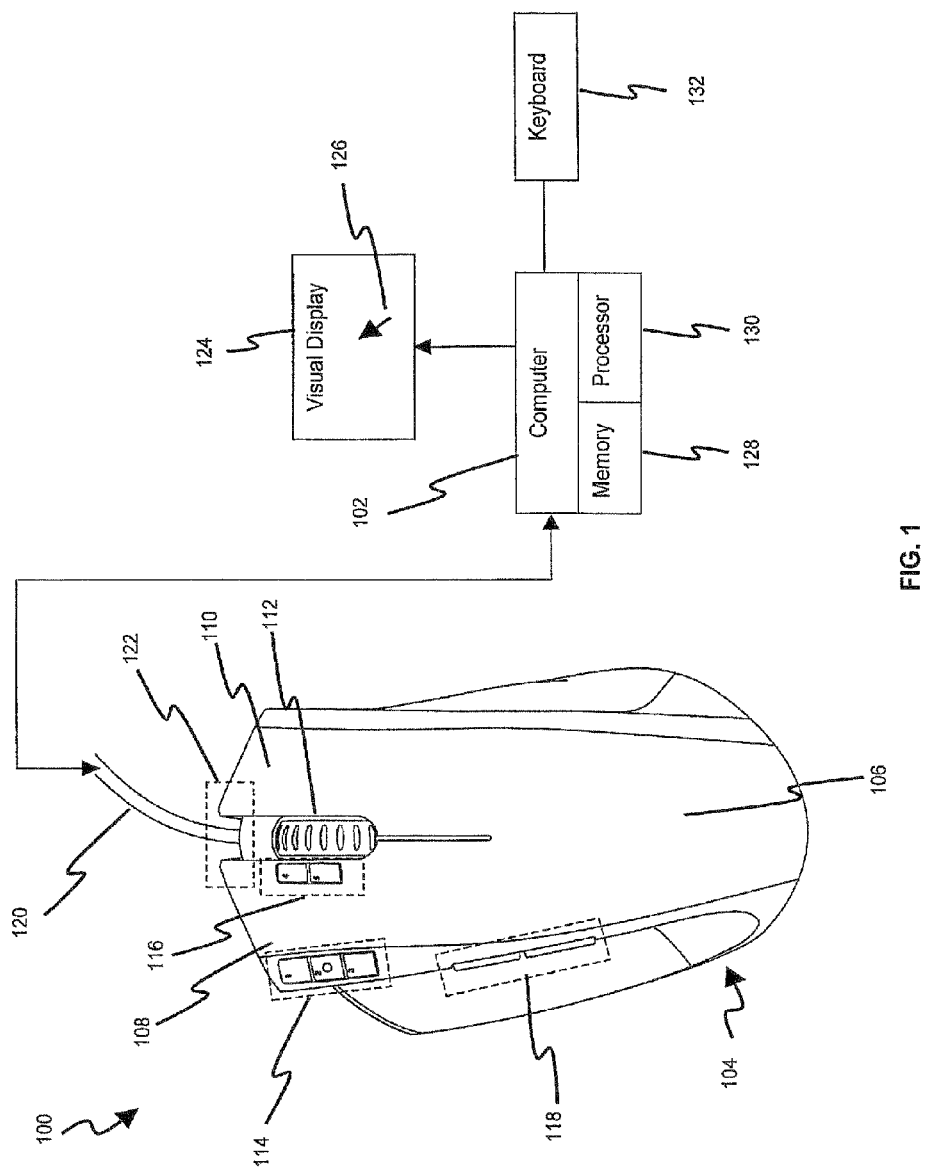
FIG. 1 is a top plan view of an input device in accordance with a first embodiment of the present invention.

An ergonomic input device with multi-programmable buttons is described hereinafter for addressing the foregoing problems.

For purposes of brevity and clarity, the description of the invention is limited hereinafter to applications related to ergonomic input devices. This however does not preclude various embodiments of the invention from other applications that require similar operating performance. The fundamental operational and functional principles of the embodiments of the invention are common throughout the various embodiments.

Exemplary embodiments of the invention described hereinafter are in accordance with FIGS. 1 to 12 of the drawings, in which like elements are numbered with like reference numerals.

Figure 2:
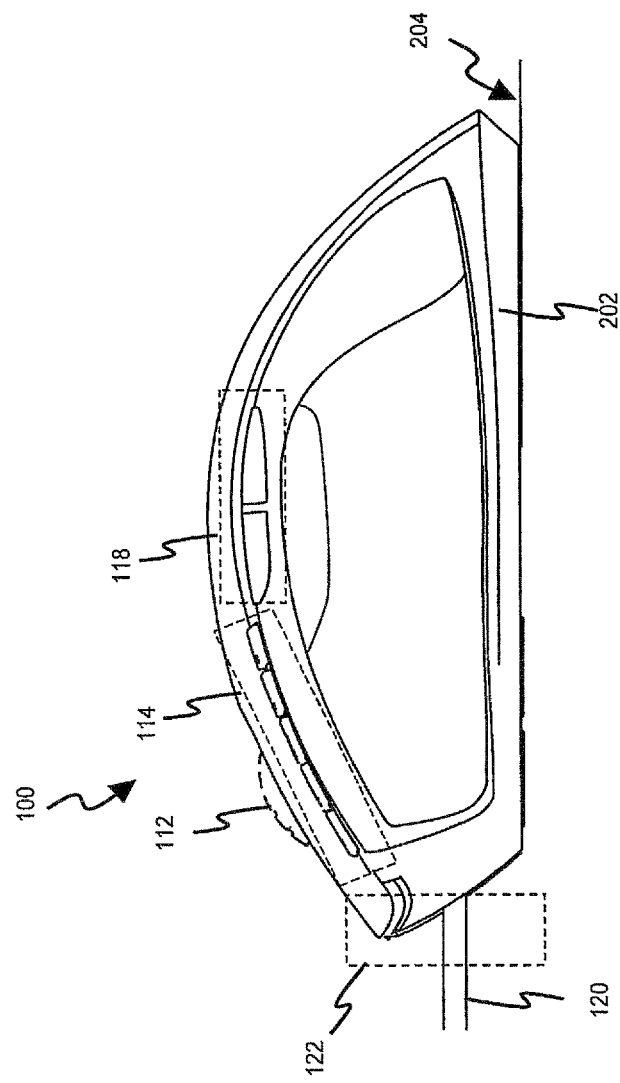
FIG. 2 is a left side elevational view of the input device of FIG. 1.
Figure 3:
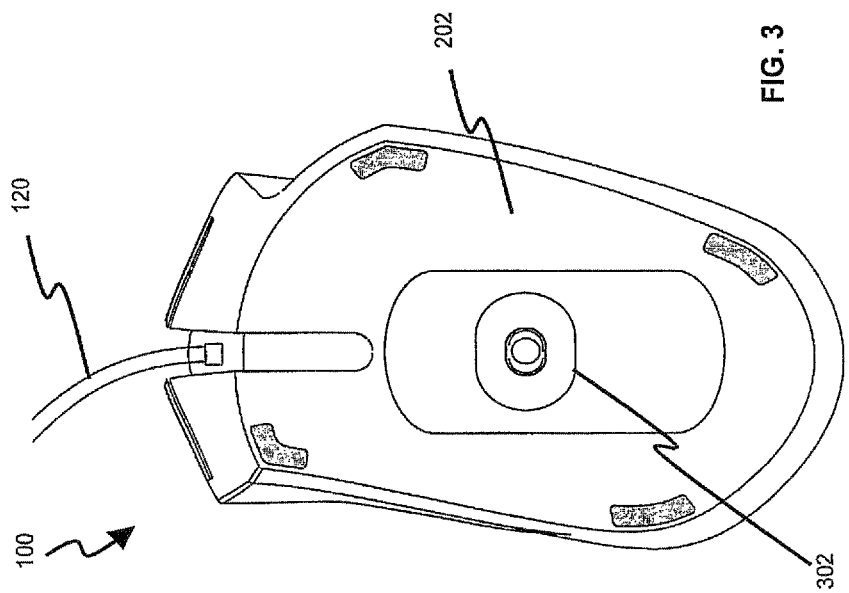
FIG. 3 is a bottom plan view of the input device of FIG. 1.

FIGS. 1 to 3 show an ergonomic input device 100 configured in accordance to an embodiment of the invention. The input device 100 is preferably a computer mouse for use together with a computer 102. The input device 100 comprises a body 104 with an upper surface 106. Three independently operated actuators are mounted on the body 104, including a primary key 108, a secondary key 110 and a scrolling wheel 112. The primary key 108, the secondary key 110 and the scrolling wheel 112 are typical actuators of a conventional computer mouse. Alternatively, the input device 100 comprises at least one of the primary key 108, the secondary key 110 and the scrolling wheel 112. Additionally, the input device 100 further comprises a first actuator module 114, a second actuator module 116 and a third actuator module 118 mounted on the body 104. Each of the first actuator module 114, the second actuator module 116 and the third actuator module 118 comprises one of a single button, a touch sensor, a slider and a switch. Preferably, each of the first actuator module 114, the second actuator module 116 and the third actuator module 118 comprises a plurality of buttons. The first actuator module 114 and the second actuator module 116 are mounted on the upper surface 104, proximal to the primary key 108. The third actuator module 118 is preferably mounted on a side surface of the body 104 as shown in FIG. 1 and FIG. 2.

When a user depresses or "clicks" either the primary key 108 or secondary key 110, a switching function is executed. Specifically, depressing either one of the primary key 108 or secondary key 110 changes an associated switch state and generates a signal that is conveyed via conductors in a cord 120 to the computer 102. One end of the cord 120 is anchored inside the body 104 and extends from an end 122 of the input device 100 while the other end of the cord 120 is coupled to the computer 102.

The computer 102 may have a multitude of designs and comprises a visual display device 124. The visual display device 124, which may be a cathode ray tube-type, active matrix display-type or other suitable device, can display a cursor (or pointer) 126, along with text and other graphical information. The computer 102 further comprises memory 128, a processor 130 and a keyboard 132.

The scroll wheel 112 is partially exposed from the body 104 to allow interaction therewith by the user. In particular, the scroll wheel 112 is supported on an axle that resides within the body 104 of the input device 100. The axle is carried by spaced-apart axle supports. The axle supports are configured to allow one end of the axle to move in a direction that is generally perpendicular to the axis of rotation of the scroll wheel 112, so that that the scroll wheel 112 is depressible by the user for activating a switch (not shown). The switch that is activated as a result of depression of the scroll wheel 112 then provides a switching signal. A spring is also preferably contained within the body 104 and arranged to provide resiliency against depression of the scroll wheel 112. In addition, an optical encoder (not shown) may be positioned on the axle for rotation with the scroll wheel 112. A light source and a light sensor is mounted within the input device 100 so as to sense the motion of the optical encoder to thereby provide a positioning signal with respect to the scroll wheel 112. A detent mechanism is also provided on the axle to provide a segmented feel to the rotation of the scroll wheel 112. The positioning and switching signals are conveyed via the cable 120 to the computer 102 for effecting changes on the visual display device 124, such as text scrolling.

Alternatively, instead of using the scroll wheel 112, other displacement transducer means such as a scroll ball, a tactile sensor or an optical sensor is usable in place of the scroll wheel 112 as well known to persons skilled in the art.

The first actuator module 114, the second actuator module 116 and the third actuator module 118, for example, are for actuating "shortcut" functions such as "page forward" or "page backward" used for web surfing. The "shortcut" functions are assignable to any buttons of the first actuator module 114, the second actuator module 116 and the third actuator module 118. The user then actuates a particular button to activate the corresponding "shortcut" function assigned thereto. Hence, as opposed to using the buttons on the keyboard 132 for activating the "shortcut" functions in a conventional manner, the user uses the first actuator module 114, the second actuator module 116 and the third actuator module 118 instead. Conventionally, the "shortcut" functions typically are assigned to and actuated using function keys of the keyboard 132 such as the "F1", "F3" or "F5" keys. Alternatively, the first actuator module 114, the second actuator module 116 and the third actuator module 118 are configurable for assigning gaming "shortcut" functions, such as "shoot", "jump" or "crouch" thereto. This then provides the user with quicker access to the various game playing functions when playing the PC games and frees the user from positioning his hands in an awkward manner on the keyboard 132 for accessing the buttons assigned with the corresponding game playing functions.

Figure 4:
FIG. 4 shows a graphical format of a software application used in conjunction for configuring the input device of FIG. 1.

A software application 400, as shown in FIG. 4, is provided for assigning the "shortcut" functions to any buttons of the first actuator module 114, the second actuator module 116 and the third actuator module 118. A unique code corresponding to the actuation of a button for activating a "shortcut" function is definable by the user through use of the software application 400. The unique code is stored under a "shortcut" profile in the storage memory (not shown) provided within the input device 100. The storage memory is preferably a semiconductor memory device such as static random access memory (SRAM) or flash memory. Alternatively, the "shortcut" profile is stored on the computer 102. Additionally, the unique code can be associated with a software application provided on the computer 102. Whenever the computer 102 detects a system signal corresponding to the unique code, the associated software application is loaded into memory 128, executed by the computer 102 and shown to the user on the visual display device 124.

The software application 400, when executed by the user provides the respective options: a button option, a launch-application option and a load-"shortcut"-profile option respectively. The button option specifies a button of one of the first actuator module 114, the second actuator module 116 and the third actuator module 118 to be configured. The launch-application option allows the user to define an associated software application to be executed by the computer 102 upon detection of the unique code corresponding to the actuation of the button configured previously using the button option. The load-"shortcut"-profile option enables the user to determine if the "shortcut" profile is retrieved by the computer 102 from the input device 100 and preloaded into memory 128 upon startup of the computer 102. Alternatively, if the "shortcut" profile is stored on the computer 102, the load-"shortcut"-profile option then enables the user to determine if the "shortcut" profile is preloaded into memory 128 upon startup of the computer 102.

Alternatively, the first actuator module 114, the second actuator module 116 and the third actuator module 118 are also configurable in that each of the first actuator module 114, the second actuator module 116 and the third actuator module 118 is mountable on a removable module. The removable module is attached to the body 104 via receptacles formed in the body 104 and attached thereto by using securing means such as interlocking latches. In addition, the removable module is also detachable from the body 104 and replaceable with another module such as a button-less module. The replaceable feature of the first actuator module 114, the second actuator module 116 and the third actuator module 118 enables the user to configure the input device 100 to be adapted for different users' hand sizes or usage preferences. In addition, the removable module contains electrical connectors for connecting to an electrical interface formed within the body 104 when the removable module is disposed within the receptacles and attached to the body 104. Electrical signals are transmitted via the conductors in the cord 120 to the computer 102 when any buttons of the first actuator module 114, the second actuator module 116 and the third actuator module 118 is actuated.

The first actuator module 114, the second actuator module 116 and the third actuator module 118 are preferably constructed from buttons that are spring-biased with respect to the body 104 as well known in the art. Alternatively, the first actuator module 114, the second actuator module 116 and the third actuator module 118 are constructed using tactile sensors. The tactile sensors are either capacitive sensors or resistive sensors. The user operates the first actuator module 114, the second actuator module 116 and the third actuator module 118 by using his fingers to perform touch actuations, which are receivable by the tactile sensors and translated into electrical signals. The use of tactile sensors for the first actuator module 114, the second actuator module 116 and the third actuator module 118 predictably extends the product life of the input device 100 in the absence of typical wear-and-tear associated with conventional buttons. Further, the user does not need substantial large downward finger movements to actuate buttons that are constructed using the tactile sensors since slight touching of the buttons is sufficient to "click" the buttons due to the sensitivity and responsiveness of the tactile sensors.

Preferably, the body 104 of the input device 100 is formed of rigid plastic and has a flat base 202 that rests on a surface 204 of a desktop while being operated by the user. The surface 204 of the desktop is substantially planar. Further, the upper surface 106 faces away from the flat base 202. In addition, two side surfaces, which are substantially perpendicular to the flat base 202, connect the upper surface 106 to the flat base 202 for forming a continuous surface and thereby forming the body 104 of the input device 100. Additionally, the upper surface 106 gradually tapers from a portion where the mid-palm area of the hand is supportable towards a portion and in a direction where the wrist of the hand is positionable when the hand of the user grips the input device 100 during usage. Further, two flanges extend outwardly from the sides of the flat base 202 to provide a larger surface area for stabilizing the input device 100 when being operated by the user on the surface 204 of the desktop. Additionally, the body 104 is comfortably shaped for gripping by the user who is operating the input device 100. The upper surface 106 of the body 104 comprises a surface area substantially large enough for supporting and resting the mid-palm area of the user's hand. In addition, the upper surface 106 also provides support to the metacarpal-phalangeal ridge of at least one of the index, middle and ring fingers of the user. Further, the upper surface 106 is preferably shaped as a continuous convex curve to conform to the natural posture of a human's hand. Hence, irrespective of the size of the user's hand operating the input device 100, the design of the body 104 ensures that the user's forearm is in the neutral zone between pronation and supination when operating the input device 100.

Further, the body 104 comprises two indentations, which are ergonomically shaped, each being formed on and along the two side surfaces of the body 104. Each of the indentations is shaped to fit and accommodate the thumb, ring finger and small finger when the user grips and operates the input device 100. Preferably, the indentation for accommodating the thumb is shaped substantially concave while the indentation for accommodating either the small finger or ring finger is shaped substantially convex. By resting the thumb and small finger on the indentations during usage, the input device 100 resides between the thumb and small finger to provide a comfortable grip or "feel" for the user.

During operation of the input device 100, the body 104 is moved relative to the surface 204 and an optical sensor 302 disposed within the body 104, on the flat base 202, senses the movement of the input device 100 and generates positional signals. The positional signals are then sent to and processed by the computer 102 to thereby move the cursor 126 on the visual display device 124.

The first actuator module 114 and the second actuator module 116 are disposed and arranged on the upper surface 106 in a manner to facilitate easy access thereto when the user is using the input device 100. As shown in FIG. 1, the first actuator module 114 is disposed on the upper surface 106 by the left edge of the primary key 108 and the second actuator module 116 is similarly disposed by the left edge of scroll wheel 112. Preferably, both the first actuator module 114 and the second actuator module 116 are arranged in a row-wise configuration. Human factor considerations were applied in the design of the configuration of the first actuator module 114 and the second actuator module 116 so as to prevent the user from engaging in awkward positioning or strained movement of the fingers, such as twisting or lateral movements of the fingers, when using the input device 100. Awkward positioning of the fingers when using any type of input devices may give rise to significant physical stresses causing discomfort to the user. Typically, the user uses the index or middle fingers for actuating any buttons of the first actuator module 114 and the second actuator module 116. Furthermore, the user also uses the index or middle fingers to actuate the scroll wheel 112. Hence, by locating the first actuator module 114 and the second actuator module 116 in the proximity of the scroll wheel 112 enables the user quick access to the buttons thereof.

Separately, the third actuator module 118 mounted on one of the side surfaces of the body 104 conveniently enables the user to use the thumb to actuate any buttons of the third actuator module 118 when gripping the input device 100. Access to buttons of the third actuator module 118 occurs with comfortable side-to-side (lateroflexion) motion of the thumb. Depression of the buttons of the third actuator module 118 occurs with slight flexion of the thumb. Thus access and actuation of the buttons of the third actuator module 118 by the user's thumb are within the expected range of thumb motion for a wide range of hand sizes. Moreover, the surface of the removable module in which the third actuator module 118 is formed on is shaped substantially concave, thus reciprocally conforming to the convex shape of the user's thumb and thereby ensuring that practically no extension of the thumb is required in moving from button to button of the third actuator module 118.

Figure 5:
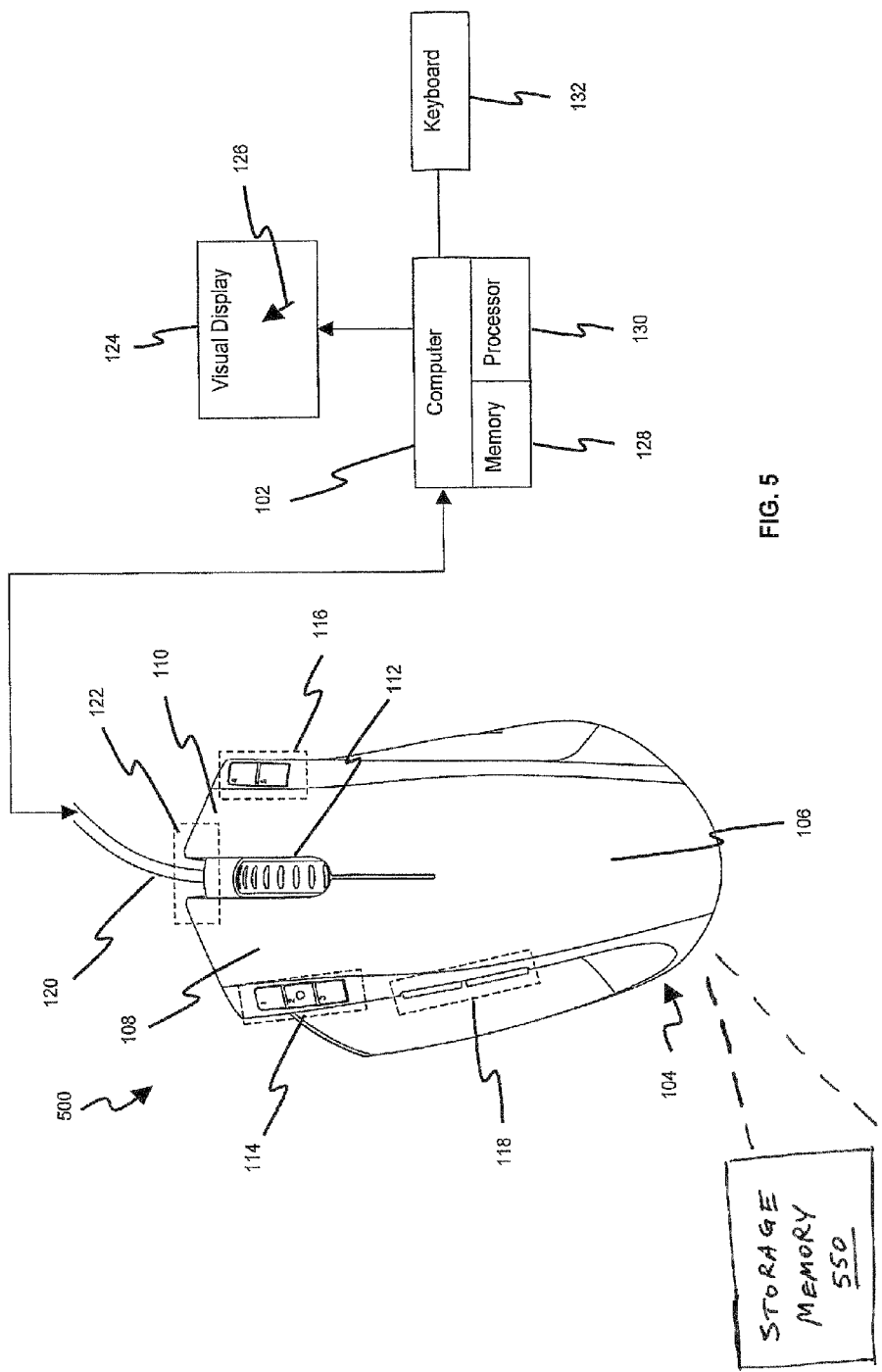
FIG. 5 is a top plan view of an input device in accordance with a second embodiment of the present invention.
Figure 6:
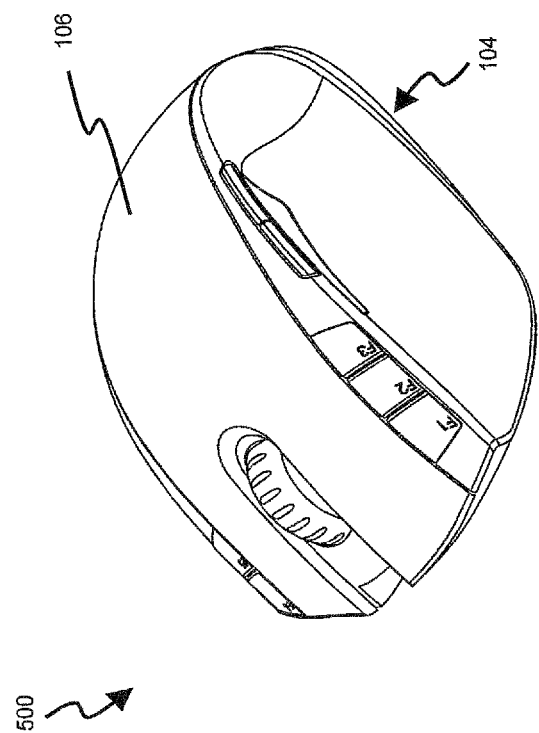
FIG. 6 is a perspective view of the input device of FIG. 5.
Figure 7:
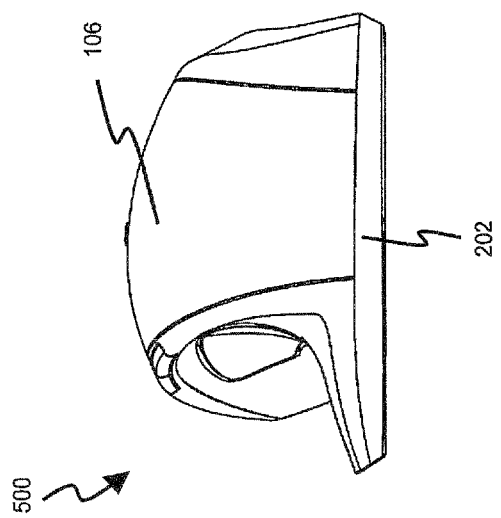
FIG. 7 is a rear elevational view of the input device of FIG. 5.
Figure 8:
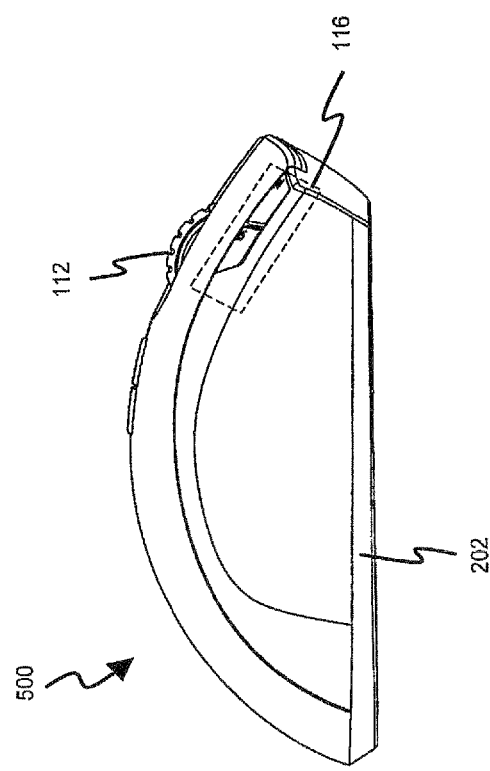
FIG. 8 is a right side elevational view of the input device of FIG. 5.

In an alternative embodiment as shown in FIGS. 5 to 8, there is yet another ergonomic input device 500 configured for use with the computer 102. The input device 500 is similarly configured as the input device 100 of FIG. 1. The input device 500 includes a storage memory that can be configured to store data, e.g., a "shortcut" profile. A unique code corresponding to the actuation of a button for activating a "shortcut" function is definable by the user through use of a software application, e.g., the software application 400. The unique code can be stored under the "shortcut" profile in the storage memory. The storage memory can be a semiconductor memory device, such as static random access memory (SRAM) or flash memory. The foregoing descriptions for the input device 100 of FIG. 1 also apply to the input device 500 of FIG. 5 except for a distinct feature difference. The feature difference between the input device 500 of FIG. 5 and the input device 100 of FIG. 1 is that the second actuator module 116 of the input device 500 of FIG. 5 is now disposed on the right edge of the secondary key 110 as clearly shown in FIG. 5. The user then preferably uses the middle finger to actuate the buttons of the second actuator module 116 instead.

Yet in another alternative embodiment as shown in FIGS. 9 to 12, there is also another ergonomic input device 900 configured for use with the computer 102. The input device 900 is similarly configured as the input device 100 of FIG. 1. The foregoing descriptions for the input device 100 of FIG. 1 also apply to the input device 900 of FIG. 9 except for a distinct feature difference. The feature difference is that the input device 900 of FIG. 9 does not include the second actuator module 116 as clearly shown in FIG. 9.

Figure 9:
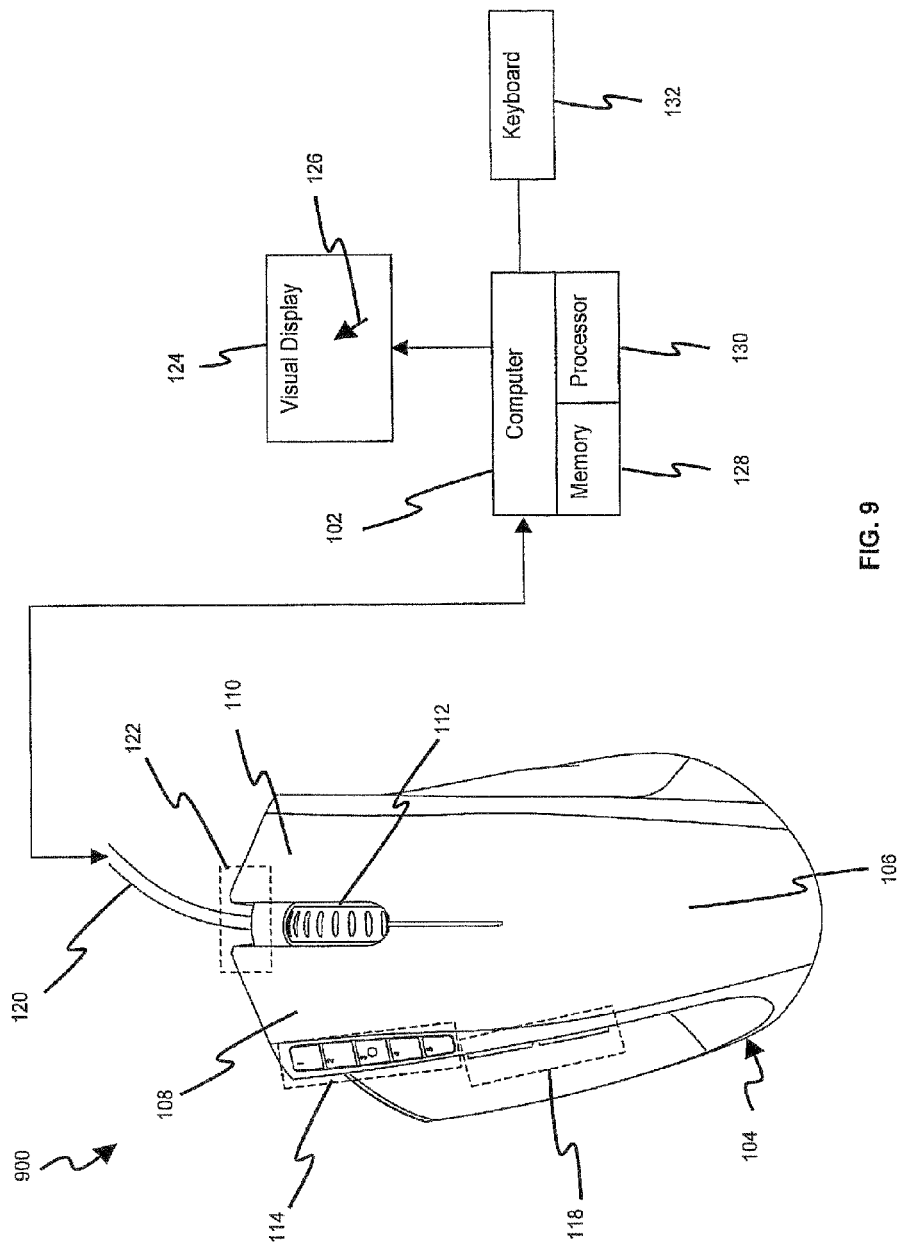
FIG. 9 is a top plan view of an input device in accordance with a third embodiment of the present invention.
Figure 10:
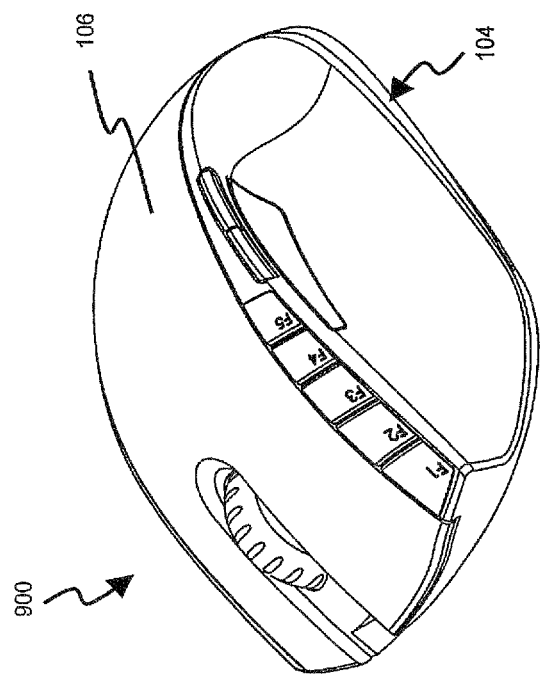
FIG. 10 is a perspective view of the input device of FIG. 9.
Figure 11:
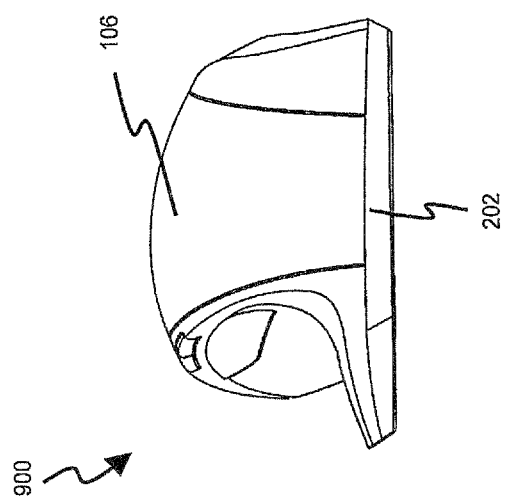
FIG. 11 is a rear elevational view of the input device of FIG. 9.
Figure 12:
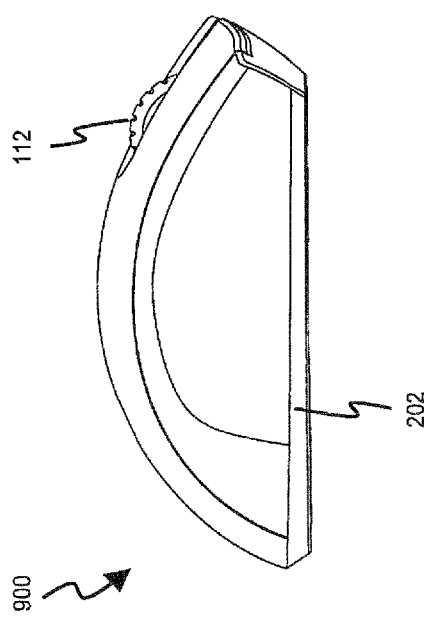
FIG. 12 is a right side elevational view of the input device of FIG. 9.

Alternatively, other ergonomic shapes for the body 104 as well known in the art are realizable and implementable for the input device 100 of FIG. 1, the input device 500 of FIG. 5 and the input device 900 of FIG. 9 without departing from the spirit and scope of the invention. In addition, communication between the computer 102 with each of the input device 100 of FIG. 1, the input device 500 of FIG. 5 and the input device 900 of FIG. 9 is by one of wired communication and wireless communication.

In the foregoing manner, an ergonomic input device with multi-programmable buttons is described according to embodiments of the invention for addressing at least one of the foregoing disadvantages. Although a few embodiments of the invention are disclosed, it will be apparent to one skilled in the art in view of this disclosure that numerous changes and/or modification can be made without departing from the spirit and scope of the invention.

The invention claimed is:

1. An input device for communicating with a processor-based device, the input device comprising:
   a circuitry;
   a first displacement transducer coupled to the circuitry for transducing detected displacement into displacement signals and communicating the displacement signals to the processor-based device for manipulating an object on the processor-based device;
   a body, housing the circuitry and the first displacement transducer, having a base for being supported on a working surface when in use, a support surface outwardly opposing the base with at least a portion of the support surface being configured for supporting a mid-palm of a user when in use and a depressible key formed on the support surface outwardly opposing the base;
   a receptacle formed in the support surface of the body and positioned along the periphery of the depressible key, the receptacle having electrical contacts formed therein and coupled to the circuitry;
   first actuator module, comprising a plurality of actuators arranged in a first configuration, receivable into the receptacle with the plurality of actuators of the first configuration mounted on the support surface to generate actuating signals communicable to the processor-based device by the circuitry for operating a shortcut function on the processor-based device that the first actuator module is replaceable with a second actuator module, which has a plurality of actuators arranged in a second configuration, to enable the user to configure the input device for adapting user's hand size or usage preference; and a storage memory configured to store under a shortcut profile a unique code corresponding to an actuation of the first actuator module for activating the shortcut function, wherein the unique code is further user-definably associable with a software application provided on the processor-based device, wherein the shortcut function is assignable to any one of the plurality of actuators by the user with a further software application operable on the processor-based device and the first configuration is different from the second configuration.

2. The input device as in claim 1, wherein the first displacement transducer is formed on the base of the body.

3. The input device as in claim 1, further comprising:
a second displacement transducer formed on the support surface and operable for generating actuating signals detectable by the circuitry, the actuating signals being communicable to the processor-based device by the circuitry for operating a scrolling function on the processor-based device.

4. The input device as in claim 3, wherein the second displacement transducer is one of a scroll wheel, a scroll ball, a tactile sensor and an optical sensor.

5. The input device as in claim 1, wherein each of the plurality of actuators of the actuator module is a tactile sensor.

6. The input device as in claim 5, wherein the tactile sensor is one of a capacitive sensor and a resistive sensor.

7. The input device as in claim 1, wherein the plurality of actuators of the actuator module is arranged in a row and positioned adjacent the depressible key.

8. The input device as in claim 1, wherein each of the plurality of actuators of the actuator module comprises an actuation surface formed along the support surface, the actuation surface of each of the plurality of actuators being dimensionally smaller than the depressible key.

9. The input device as in claim 1, wherein the shortcut function comprises one of a keyboard shortcut function and a gaming shortcut function.

10. The input device as in claim 1, wherein the plurality of actuators of the first and/or second actuator module are a plurality of first, a plurality of second and a plurality of third actuators respectively arranged in row that the third plurality of actuators are configured to be depressible by a force substantially perpendicular to the force capable of depressing the first and second plurality of actuators, which are located on the planar surface of the depressible key.

11. The input device as in claim 10, wherein the first and second plurality of actuators are spaced apart with a gap allowing resting of one or two fingers thereon and arranged in a fashion to be depressible by the resting fingers without lifting the mid-palm supported on the support surface.

12. An input device for communicating with a processor-based device, the input device comprising:
a circuitry;
a first displacement transducer coupled to the circuitry for transducing detected displacement into displacement signals, the circuitry for communicating the displacement signals to the processor-based device for manipulating an object on the processor-based device;

a body, housing the circuitry and the first displacement transducer, comprising a base for being supported on a working surface when in use, a support surface outwardly opposing the base, with at least a portion of the support surface for supporting a mid-palm of a user when in use, and side surfaces located in between the base and the support surface;

a first depressible key, formed on the support surface of the body, having a first edge and an opposing second edge; and a first plurality of actuators, positioned adjacent to the first edge of the depressible key, each actuator within the first plurality of actuators having an actuation surface that is dimensionally smaller than the first depressible key and being coupled to the circuitry, wherein the first plurality of actuators is operable for generating actuating signals detectable by the circuitry, the actuating signals being communicable to the processor-based device by the circuitry for operating a shortcut function on the processor-based device;

a second depressible key, formed on the support surface, having a first edge and an opposing second edge, with the first edge of the second depressible key aligned and closer, in relative to the second edge of the second depressible key, to the second edge of the first depressible key such that the first and second depressible keys are disposed adjacent to each other;

a second plurality of actuators, positioned between the first depressible key and the second depressible key along the second edge of the first depressible key, each actuator within the second plurality of actuators having an actuation surface that is dimensionally smaller than the first depressible key and being coupled to the circuitry, wherein the second plurality of actuators is operable for generating actuating signals detectable by the circuitry, the actuating signals being communicable to the processor-based device by the circuitry for operating a function on the processor-based device; and a storage memory configured to store under a shortcut profile a unique code corresponding to an actuation of the first plurality of actuators for activating the shortcut function, wherein the unique code is further user-definably associable with a software application provided on the processor-based device, wherein the shortcut function is assignable to any one of the first plurality of actuators by the user with a further software application operable on the processor-based device, wherein the first and the second plurality of actuators are fabricated on a first removable module fashioned to be replaceably attached with a second removable module to the body to enable the user to configure the input device for adapting user's hand size or usage preference.

13. The input device as in claim 12, wherein the first and second plurality of actuators are spaced apart with a gap allowing resting of one or two fingers thereon and arranged in a fashion to be depressible by the resting fingers without lifting the mid-palm supported on the support surface.

* * * * *